(12) United States Patent
Campisi et al.

(10) Patent No.: US 7,827,743 B2
(45) Date of Patent: Nov. 9, 2010

(54) ENERGY CONSERVING ACTIVE THERMAL INSULATION

(76) Inventors: Francis H. Campisi, 3 Lincoln Rd., Waterford, CT (US) 06385; James F. Campisi, 33 Savi Ave., Waterford, CT (US) 06385

( * ) Notice: Subject to any disclaimer, the term of this patent is extended or adjusted under 35 U.S.C. 154(b) by 825 days.

(21) Appl. No.: 11/274,820

(22) Filed: Nov. 14, 2005

(65) Prior Publication Data

US 2006/0283536 A1    Dec. 21, 2006

Related U.S. Application Data

(60) Provisional application No. 60/692,512, filed on Jun. 21, 2005.

(51) Int. Cl.
*E04H 12/28* (2006.01)
*E04B 7/00* (2006.01)

(52) U.S. Cl. ............................... 52/198; 52/95

(58) Field of Classification Search ............ 52/95, 52/198, 199, 404.1, 309.1, 309.6, 309.15, 52/16, 60, 407.5, 787.11, 784.15, 794.1; 454/185; 165/53–57, 185
See application file for complete search history.

(56) References Cited

U.S. PATENT DOCUMENTS

| | | | |
|---|---|---|---|
| 1,168,304 A | 1/1916 | Hellstrom | |
| 2,007,689 A | 7/1935 | Merrill | |
| 2,119,038 A | 5/1938 | Bell | |
| 2,312,987 A * | 3/1943 | Grassick | 52/789.1 |
| 2,392,240 A | 1/1946 | Frankel | |
| 2,793,509 A | 5/1957 | Keen | |
| 2,969,617 A * | 1/1961 | Michelier | 52/302.3 |
| 4,103,598 A | 8/1978 | Cooper | |
| 4,279,291 A | 7/1981 | Lambert | |
| 4,286,420 A * | 9/1981 | Pharmakidis | 52/404.1 |
| 4,290,247 A | 9/1981 | Alderman | |
| 4,315,392 A * | 2/1982 | Sylvest | 52/309.1 |
| 4,372,691 A * | 2/1983 | Buckley | 374/44 |
| 4,375,831 A * | 3/1983 | Downing, Jr. | 165/48.1 |
| 4,658,552 A * | 4/1987 | Mulford | 52/94 |
| 4,677,903 A | 7/1987 | Mathews, III | |
| 4,712,349 A * | 12/1987 | Riley et al. | 52/408 |
| 4,841,702 A * | 6/1989 | Huettemann | 52/309.12 |

(Continued)

FOREIGN PATENT DOCUMENTS

DE        4210352        10/1993

*Primary Examiner*—Richard E Chilcot, Jr.
*Assistant Examiner*—Andrew J Triggs
(74) *Attorney, Agent, or Firm*—Verrill Dana, LLP; Chris A. Caseiro

(57) ABSTRACT

An energy conserving active thermal insulation arrangement installed upon the ambient surface of an insulated structure employing alternately spaced insulated air channels and insulated conductive ply channels. A thin conductive ply conveys the energy by conduction from the airflow into the adjacent conductive ply channels, that contain an additional layer of foam which improves the conservation of energy. The conductive ply is placed above and below structural openings which would otherwise restrict airflow. The airflow is drawn from beneath the frost line, exhaust ventilation or sunspace. A math model solution determines the energy necessary to maintain a desired room temperature for each hour of the day which characterizes the thermal resistance. As the ambient temperature fluctuates, the resistance varies, however the energy for 24 hours is used to determine the total apparent resistance. Examples of apparent resistance R-value have been improved beyond any published resistance values to date.

9 Claims, 7 Drawing Sheets

U.S. PATENT DOCUMENTS

| | | |
|---|---|---|
| 5,433,050 A | 7/1995 | Wilson et al. |
| 5,561,958 A | 10/1996 | Clement et al. |
| 5,598,677 A | 2/1997 | Rehm, III |
| 5,755,067 A * | 5/1998 | Mercurio .................. 52/268 |
| 5,761,864 A * | 6/1998 | Nonoshita ................ 52/302.3 |
| 5,770,295 A | 6/1998 | Alderman |
| 5,927,032 A * | 7/1999 | Record .................. 52/309.11 |
| 6,269,598 B1 | 8/2001 | Wintermantel |
| 6,408,582 B1 | 6/2002 | Shim |
| 6,418,686 B1 * | 7/2002 | Record .................. 52/309.15 |
| 6,754,997 B2 * | 6/2004 | Bonin .................... 52/220.1 |
| 6,769,220 B2 * | 8/2004 | Friesner .................. 52/605 |
| 6,843,718 B2 | 1/2005 | Schmitz |
| 6,860,079 B2 * | 3/2005 | Schwarz .................. 52/786.1 |
| 6,860,082 B1 * | 3/2005 | Yamamoto et al. ......... 52/794.1 |
| 7,107,731 B2 * | 9/2006 | Record .................... 52/309.9 |
| 2002/0043045 A1 * | 4/2002 | Marino Del Din ......... 52/783.1 |
| 2003/0061776 A1 * | 4/2003 | Alderman ................ 52/404.1 |
| 2006/0283536 A1 * | 12/2006 | Campisi et al. ............. 156/71 |

* cited by examiner

ENERGY CONSERVING ACTIVE THERMAL INSULATION

CROSS REFERENCE TO RELATED APPLICATION

The present application claims the priority benefit of U.S. provisional patent application Ser. No. 60/692,512, filed Jun. 21, 2005, entitled "INSUL-PLY THE ORIGINAL HEAT CONVEYOR ACTIVE INSULATION" of the same named inventors. The entire contents of that prior application are incorporated herein by reference.

BACKGROUND OF THE INVENTION

1. Field of the Invention

The present invention relates to an active thermal insulation and its ability to conserve energy by improving the thermal resistance, R, of an insulated structure beyond known values published to date.

2. Description of the Prior Art

Building structures built for human occupancy contain heating and cooling equipment to maintain a desired level of comfort. Insulation is placed in the walls, floors and ceilings of the building envelope. Insulation material relies upon trapped air within or about the material. It is a passive material with a fixed thermal resistance R for the conduction of energy.

The rate at which heat will flow through the wall or ceiling by conduction is dependent upon at least two factors: (1) the temperature difference and (2) the thermal resistance, R-value, of the total structure between the ambient and room temperature. To increase the efficiency of heating or cooling a structure to retard the flow of heat, more insulation or more efficient insulation is used. This has resulted in thicker walls to accommodate more insulation. Ceilings beneath the attic space are inherently unrestricted for additional passive insulation. Once the insulation is installed the heat transfer characteristics remain fixed regardless of the fluctuating ambient temperatures.

Several techniques to change the temperature difference between the ambient and room temperature have used air currents within the wall cavity. The air currents on occasion have been tempered by earth thermal energy or solar energy. Pluralities of air channels that carry the energy have been employed from both bottom to top and top to bottom of the wall cavity. Complete coverage of the building envelope in air channels has been proposed in U.S. Pat. No. 5,761,864 which describes a building comprising an exterior wall having a plurality of vertical air channels. The U.S. Pat. No. 5,761,864 patent does not disclose the treatment of an external wall with structural openings. There is no airflow or conductive ply to transfer the energy perpendicular to areas over and under the structural openings. Phase change material within the wall cavity accomplishes a constant temperature difference between the room temperature and the phase change material. The phase change material and containment are cumbersome because the material changes from solid to liquid and back again. A source of energy is required to accomplish the reversal.

There is therefore, a need in the art for a more efficient method of insulating a building structure.

OBJECTIVES AND ADVANTAGES OF THE PRESENT INVENTION

The present invention is a system to improve the insulation of building structures. Several objects or advantages of the present invention are that:

(a) The present invention is an insulation structure that may be applied to an internal building structure but that is not specifically part of the internal structure. The design and use of the internal structure is therefore not compromised.

(b) It is simple for a manufacturer to produce and/or deploy because it includes a low density plastic foam and a thin conductive ply.

(c) It is installed on the ambient surface of an insulated structure to form vertical air channels and ply channels. Air is introduced into each of the air channels. The ply channels do not use any air, thus limiting the amount of airflow. Openings, windows or doors do not limit the function of the ply channel, and it is placed under and over these openings.

(d) A thin conductive ply conveys by conduction the energy to or from the air channel to the ply channel, which becomes an "active equivalent air channel" without the use of additional airflow. An extra layer of plastic foam is placed against the ambient surface of the structure within the ply channel since the conductive ply is thin.

(e) The efficiency of the ply channel to retard the flow of energy into or out of the room of the structure is improved by the addition of an extra layer of low density plastic foam. This is an advantage over the efficiency of only air channels.

(f) The air that is used at the entry of the air channel may be ambient air tempered by the earth's thermal energy from beneath the frost line. The use of plastic tube or equivalent heat exchanger or foundation drain of at least 4" in diameter is ideal for tempering the ambient air.

(g) The airflow in the air channel is modest, at a range of 35 to 65 cfm per 1000 sq. ft. of surface treatment. A small blower using positive or suction pressure may accomplish the airflow.

(h) As the ambient temperature varies during the day, the airflow temperature in the air channel is also affected by the variation. The temperature of the airflow in the air channel is directly related to the temperature difference for the determination of R-values. The R-value is variable as the ambient temperature fluctuates each hour. The average of R-values for a 24-hour period is termed by an apparent R-value.

(i) In locations where earth thermal tempered air is not feasible, exhaust ventilation from room temperature air is introduced at the entry of the air channel. If the location has a supply of solar energy, the solar assist can be used to increase the volume of room temperature air exhaust.

(j) The volume of air is determined by reference to a graph of variation of apparent R-value vs. exhaust ventilation flow for the purpose of selecting an improved apparent R-value.

(k) Examples of apparent R-values are much greater than the known published resistance values, particularly when the active insulation is applied in a 2" thick envelope over a 2"×4" stud wall with 3½" fiberglass insulation as compared to 2"×6" stud wall with a 5½" fiberglass insulation. Table 1 of the ensuing description list the apparent R-value as high as 66.23 for the referenced examples for exhaust ventilation. These are understood to be examples and in no way represent the entire scope of the present invention, as those skilled in the art will recognize that alternative insulation thicknesses and structural dimensions may be established to produce different R-values.

(l) Additional graphs of advanced arrangements of active thermal insulation are also included in the ensuing description. A math model solution is used to create the graphs showing the variation of R-values with an airflow expressed in cfm per 1000 sq. ft. of active thermal insulation treatment. Graph 4 shows the variation of apparent R-value for two arrangements of air channel to ply channels area ratios for exhaust ventilation. The apparent R-value increases with an increase of airflow in the air channel for a 1:1 ratio of air surface to ply surface.

SUMMARY FOR THE INVENTION

The present invention is a structural system of insulative and support materials designed in the arrangement described herein to aid in conserving the energy in an insulated building structure by improving the thermal resistance R of the building structure. The invention is not part of the structure, but is applied to the ambient surface of the structure. It is an active system employing air channels and a conductive ply within insulated ply channels alternately spaced.

One embodiment of the invention provides for a thermally conductive ply to transport the energy perpendicular to the airflow into an adjacent ply channel. The conductive ply become an "active equivalent air channel" and performs as the vertical airflow in the ply channel. The conductive ply, which is thin, allows the channel space to accommodate an additional layer of low-density plastic foam, which increases the resistance to the flow of energy to or from the structure. The vertical airflow, which is restricted by structural openings, is placed on both sides of the openings of window, doors, fireplaces etc. The conductive ply channel, which is not restricted, is placed under and over the openings. The installation is repeated to cover the surface of the structure.

The volume and airflow temperature is determined by where the air is drawn, either from beneath the frost line, from exhaust ventilation, or from a sunspace.

During the heating season both the airflow and the conductive ply temperature is cooled by conduction to the ambient temperature, and at the same time heated from the room temperature conduction. The conductive ply temperature diminishes according to its length, thickness and thermal conductance into the conductive ply channel.

A math model has been developed to determine the amount of energy required to maintain a desired room temperature for a selection of arrangements of air and ply channel surfaces and the 11 variables included in the math model for each hour of the day. Further objects and advantages of the invention will become apparent from a consideration of the drawings, table, graphs, trials and ensuing description.

REFERENCE NUMERALS IN DRAWINGS

Figure 1:
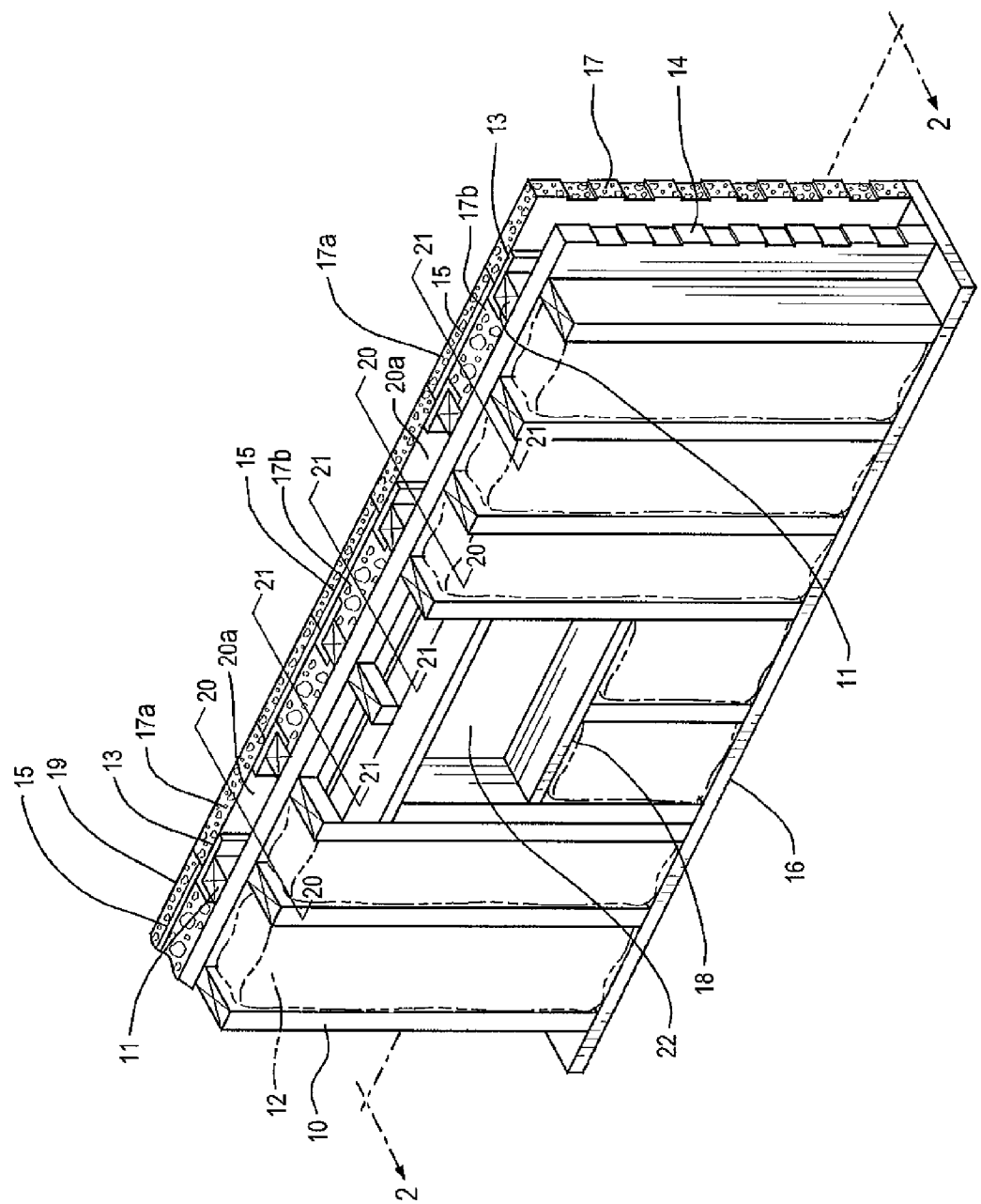
FIG. 1 is a partial isometric view of the invention installed upon the ambient surface of a conventional stud wall containing a window opening.

| 10  | Stud              | 11  | Spacer                           |
|-----|-------------------|-----|----------------------------------|
| 12  | Fiberglass        | 13  | Conductive Ply Segment           |
| 14  | Exterior Sheeting | 15  | Conductive Ply                   |
| 16  | Base plate        | 17a | First Layer Low Density Plastic Foam Insulation |
|     |                   | 17b | Second Layer Low Density Plastic Foam Insulation |
| 18  | Transverse Stud   | 19  | Ambient Air Surface              |
| 20  | Air Channel       | 21  | Conductive Ply Channel           |
| 20a | Air Gap           |     |                                  |
| 22  | Window Opening    |     |                                  |

Through all the figures, same or corresponding elements are generally indicated by the same reference numerals.

DETAILED DESCRIPTION OF THE PREFERRED EMBODIMENTS OF THE INVENTION

FIG. 1 shows a partial isometric view of an active insulation structure of the present invention. The active insulation structure establishes one or more air channels 20 and one or more thermally conductive ply channels 21. As shown in the representative illustration of FIG. 1, the active insulation structure is shown installed upon the exterior surface of the exterior sheeting 14 forming part of a building structure to be insulated, with the air channels 20 located outside of and adjacent to both sides of a window opening 22. The window opening 22 is formed between wall studs 10 and transverse studs 18. The exterior sheeting 14 is fastened to the wall studs 10 and a base plate 16 of the structure to be insulated. The air channel 20 extends from the base to the top of the wall in areas of the structure where the airflow is not obstructed by windows and/or other openings. The air channel 20 is formed between first layer of insulation 17a, preferably a low-density foam but not limited thereto, and the exterior sheeting 14 of the building structure and includes for each air channel 20 an air gap 20a between the first layer of insulation 17a and the exterior sheeting 14. More specifically, the air channel 20 surface area is formed between two low conductive spacers 11 installed upon the exterior sheeting 14, with the air gap 20a between the two spacers 11. The spacers 11 are preferably constructed from the same low density foam as first layer of insulation 17a, or alternatively from a higher density plastic foam, wood, or equal plastic composite.

The conductive ply channel 21 is formed between an adjacent set of two low conductive spacers 11 and is filled with the first layer of insulation 17a, a thermally conductive ply 15 and a second layer of insulation 17b. As can be seen in the drawings, the spacers 11 of the air channel 20 and the spacers 11 of the conductive ply channel 21 have a spacer in common. The conductive ply channel 21 is placed under and above the window opening 22 and also adjacent to the air channel 20. A thermally conductive ply segment 13, which is preferably a bent strip of conductive ply or conductive angle, is placed over the spacer 11 so that it extends into the air channel 20. The conductive ply segment 13 which is preferably the same material as the conductive ply 15, is installed over the spacer 11 for the purpose of conducting the air channel 20 airflow temperature to the conductive ply 15. The conductive ply 15 is preferably a thin metallic foil of high thermal conductivity such as silver, gold or aluminum, whereas aluminum is the least costly foil for its conductive properties. The conductive ply 15 of the conductive ply channel 21 is installed over the spaces 11 and conductive ply segment 13 and between the two layers of insulation 17a and 17b, as indicated, where the second layer of insulation 17b bears upon the exterior sheeting 14 of the insulated structure. The exterior sheeting 14 is the part of the insulated structure fastened to the studs 10, which form spaces in the structure to be insulated for the purpose of receiving conventional insulation materials, such as fiberglass 12 having a specified selectable insulation R-value.

Figure 2:
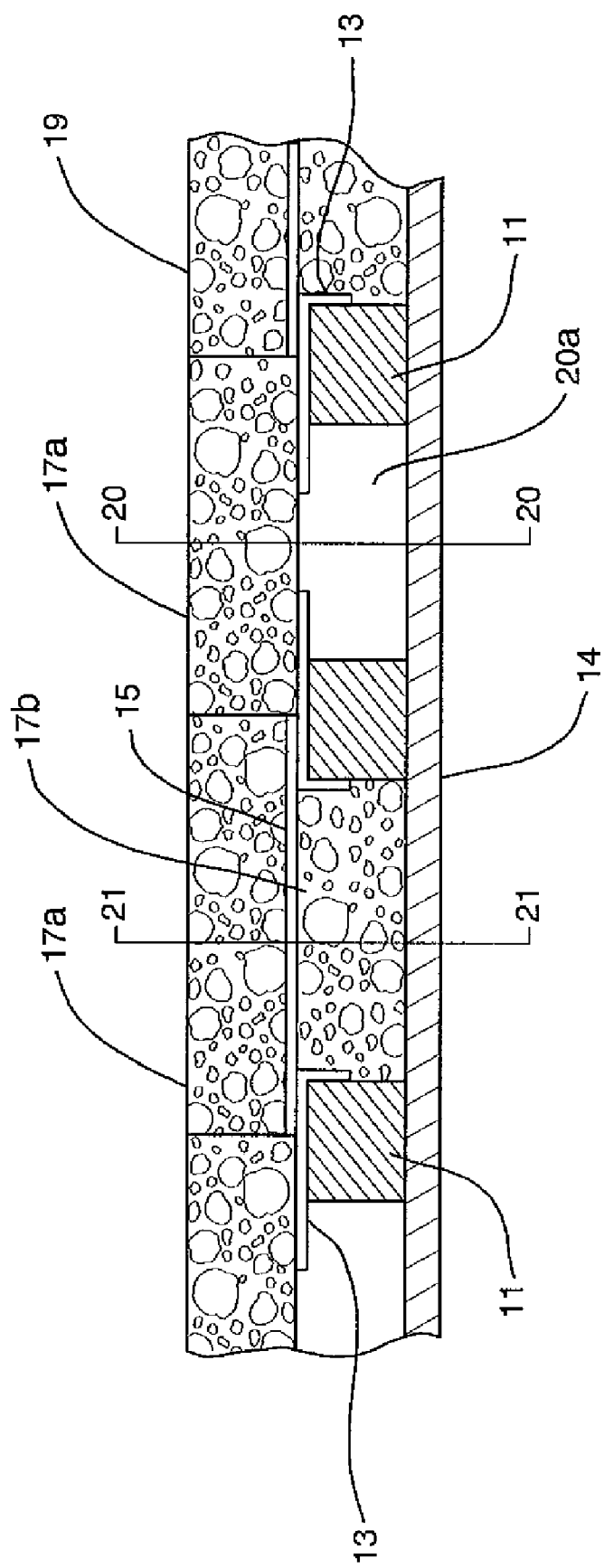
FIG. 2 is a cross-section of an air channel and a conductive ply channel installed upon the ambient surface of a building structure.

FIG. 2 is a cross-sectional view of the arrangement and relationship between the air channel 20 and the conductive ply channel 21. As noted, the air channel 20 is formed between the exterior sheeting 14 of the structure and the first layer of insulation 17a and bordered between spacers 11 and conductive segment 13. As shown, the air gap 20a of the active air channel 20 is an elongated channel separating the pieces of insulation of the second layer of insulation 17b between the first layer of insulation 17a and the exterior sheeting 14 when the insulation structure of the present invention is applied to the exterior sheeting 14. The conductive ply channel 21 is formed of the conductive ply 15 surrounded by the two layers of insulation 17a and 17b. The conductive ply 15 is positioned between the two layers of insulation 17a and 17b for the purpose of conveying energy by conduction from the adjacent airflow of air channel 20 into the conductive ply channel 21. The temperature of the conductive ply 15 diminishes along its length into the conductive ply channel 21 in accordance with its thickness, length and conductivity per square foot of surface area.

The volume and temperature of the airflow is dependent upon from where the air is drawn; from beneath the frost line, exhaust ventilation or sunspace. In one example of the invention, the volume of airflow in the air channel 20 is modest at a range of 35-65 cfm per 1000 sq ft of surface area of the installation of the conserving active thermal insulation. The air is admitted at the entry of the air channel 20 and exhausts either to ambient or to an area such as a cathedral ceiling containing additional active thermal insulation or attic space for additional use of airflow temperatures. During the heating season, the airflow in the air channel 20 is cooled by the energy conducted to the ambient air surface 19 and at the same time, heated by energy conducted from the exterior sheeting 14 and cooled by the energy conducted to the conductive ply segment 13 and conductive ply 15. The conductive ply 15 of the conductive ply channel 21 is also cooled by the energy conducted to the ambient air surface 19 and heated by the energy conducted from the exterior sheeting 14. The total energy, Btu/hr, required to maintain the room temperature of the structure is the sum of the energy conducted from the exterior sheeting 14 to the air channel 20, and from the exterior sheeting 14 to the conductive ply 15 of the conductive ply channel 21. The definitive amount of energy, Btu/hr, conducted from the exterior sheeting 14 to the air channel 20 is the temperature difference between the room temperature of the structure and airflow temperature in the air channel 20 multiplied by the conductance of the structure and multiplied by the square feet of air channel 20 surface. The definitive amount of energy, Btu/hr, conducted from the exterior sheeting 14 to the conductive ply 15 in the conductive ply channel 21 is the temperature difference between the room temperature and the conductive ply 15 temperature along its length multiplied by the total conductance of the structure including the second layer of insulation 17b and multiplied by the square feet of conductive ply channel 21 surface. During the summer season the conduction of energy is reversed.

Figure 3:
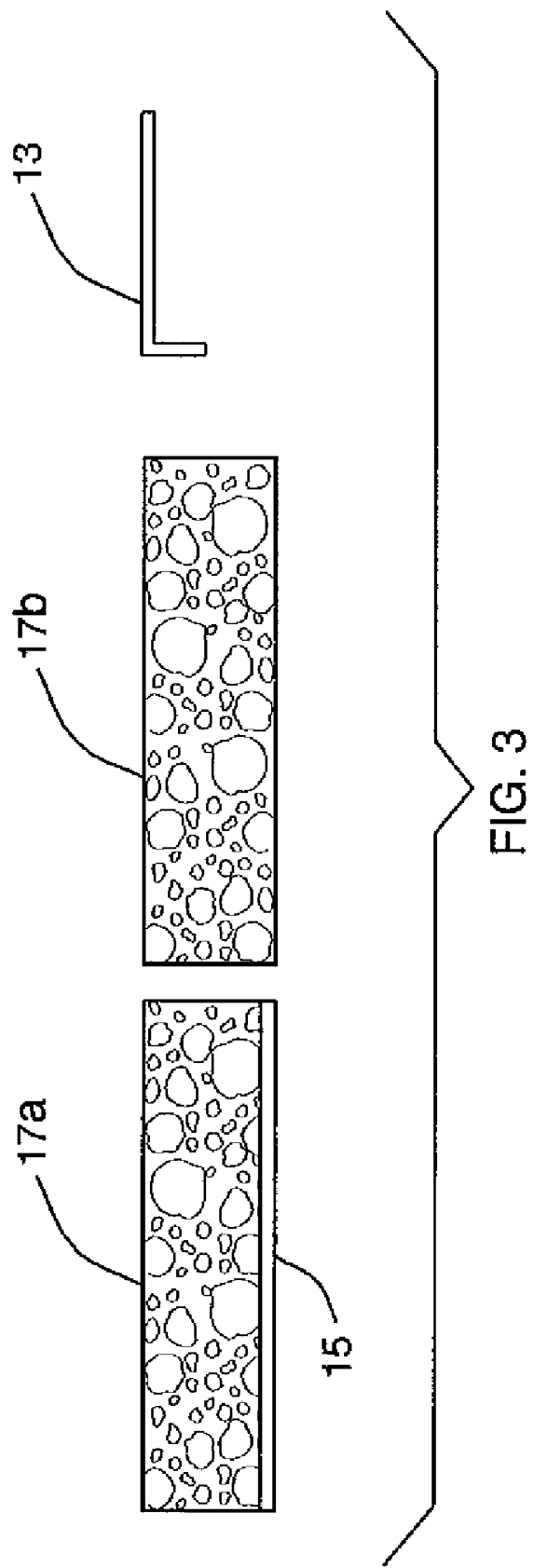
FIG. 3 is a cross section of the three elements of the invention.

A math model solution for a number of arrangements was used to determine the airflow temperature of the air channel 20 and the temperature of the conductive ply 15, which diminishes along its length into the conductive ply channel 21. The math model solution determines the amount of energy, Btu/day, necessary to maintain a desired room temperature within an insulated structure for each hour as the ambient temperature fluctuates for arrangements of air channel 20 surface area to ply channel 21 surface area. Related FIG. 3 shows the cross-section of discrete components, the first layer of the insulation 17a, the conductive ply 15, the second layer of insulation 17b and conductive segment 13.

Mathematical Model Solution

A math model solution has been developed to determine the amount of energy required to maintain a desired room temperature for a selection of variables for each hour of the day. The amount of energy, Btu/hr, is also the resistance to the flow of energy required and is used to determine a value of R. As the ambient temperature varies each hour during the day the resistance to the flow of energy, R, also varies each hour. However, since the sum of the energy is known for 24 hours, a value of R can be determined to be an apparent R-value for the 24-hour period and expressed as: Apparent $R = A \cdot \Delta T \cdot 24 / Q$ Where: A=Area, $\Delta T$=Temperature Difference, 24=Hours, and Q=Btu/Day The developed math model has the ability to determine the effect of each variable upon the energy required to maintain a specific room temperature of an insulated structure with an arrangement of the active thermal insulation applied. The active thermal insulation may use standard materials which are available at affordable costs and that can be applied with little change in construction practices. The math model solution allows a designer to achieve an improved apparent R-value by selecting the variables. The cost of design changes should be compared to the cost savings in energy. The pay back period can be determined for each design change which uses the conserving active thermal insulation.

The math model also allows a designer to achieve an improved apparent R-value by selecting the variables. The variables are as follows:

a) Area size of the treatment, vertical length×width ($ft^2$)
b) Area of the air channel ($ft^2$)
c) Volume of the airflow (cfm)
d) The temperature of the airflow (° F.)
e) The surface area of the conductive ply channel ($ft^2$)
f) The thickness of the conductive ply (in)
g) The length of the conductive ply into the conductive ply channel (in)
h) The conductance for the flow of heat to or from the insulated structure (Btu/hr $ft^{2}$° F.)
i) The ambient temperature and its variation (° F.)
j) The desired room temperature (° F.)
k) The conductance for the flow of heat to or from ambient (Btu/hr $ft^{2}$° F.)

The math model solution was checked against a full-scale model test box formed substantially in accordance with the structure shown in FIG. 1. At steady state conditions, the test box of arrangements results agreed within 3% of the calculated heat flow (Btu/hr) using the math model solution.

Math Model Solution Flow Chart

The math model solution uses an iterative solution for the amount of energy necessary to maintain the room temperature of an insulated building structure with an installation of arrangement of active thermal insulation. The solution employs equations from The Chemical Engineers Handbook utilizing the following steps:

1) Select an arrangement of air channel to ply channel surface areas.
2) Select the thickness and surface dimension of low density plastic foam whose thermal resistance is known.
3) Place the air channel surface area on both sides of the structural openings. The ply channel surface area is placed adjacent to the air channel and over and under the structural openings.
4) Determine the thermal conductance of the insulated building structure.
5) Determine the total thermal conductance of the insulated building structure with an extra layer of low density plastic foam.
6) Select the thickness of the conductive ply and its length into the conductive ply channel.
7) Select the volume and temperature of the exhaust ventilation or ambient airflow tempered by a heat exchanger beneath the frost line.
8) Select the ambient temperature and its sinusoidal variation for each hour.
9) Select a constant or desired room temperature for the insulated building structure.
10) Select a minimum of 8 iterations for the first solution.
11) Determine the airflow temperature for ⅛ of the air channel surface, which is the first iteration of the first hour, by subtracting the energy conducted to ambient plus the energy conducted from the insulated building structure and by subtracting the energy conducted to ⅛ of the length and thickness of the conductive ply.
12) Determine the temperature of the ⅛ of the conductive ply area, which is the first iteration of the first hour, in accordance with its thermal conductance minus the energy conducted to ambient plus the energy conducted from the insulated building structure and minus the energy conducted to the next iteration of conductive ply area.
13) Determine the airflow temperature of the air channel by subtracting the summation of energy conducted to the conductive ply for the 8 iterations in accordance with the thermal heat capacity of air.
14) Determine the energy conducted from the structure to the conductive ply for the first hour, which is the summation of energy of each iteration of the ply surface area, multiplied by the temperature difference between the iteration of ply temperature and room temperature, and multiplied by the conductance of the insulated building structure with an extra layer of low density plastic foam.
15) Determine the energy conducted from the structure to the airflow for first hour, which is the summation of each iteration of air channel surface area multiplied by the temperature differences between each iteration of the airflow and room temperature, and multiplied by the conductance of the insulated building structure.
16) Determine the energy conducted from the insulated building structure for each additional hour at a new ambient temperature.
17) The summation of energy conducted from the insulated building structure to the air channel and ply channel for each hour is a measure of the resistance of the insulated building structure with an active thermal insulation, which is determined to be an apparent R-value for a 24-hour period.
18) If a heat exchanger is used, determine the airflow temperature of the ambient air temperature by passing the airflow through a heat exchanger surface beneath the frost line in accordance with the log mean temperature difference for parallel flow within a heat exchanger and continue from step number 8.

Math Model Application

Math model application is for arrangements of air channels and ply channels surface areas which may be selected from the availability of standard sizes of low density plastic foam or from the examples discussed in advance design arrangements. The advance design arrangements use a ratio of 1 air channel surface to 2 ply channel surfaces or 1 air channel surface to 4 ply channel surfaces. The selection of an arrangement is dependant upon where the airflow is drawn. The ply channel is more efficient than the air channel and is selected at lesser airflow volumes for the conservation of energy from the exhaust ventilation of room temperature air.

If ambient air is chosen, the air should be admitted from ambient through a heat exchanger or foundation drain of at least a standard 4" diameter plastic pipe from beneath the frost line. This path tempers the ambient air using the earth thermal temperature of approximate 50-55 degrees Fahrenheit the year around.

If the air channel utilizes exhausted ventilation air that is generally required for industrial processes, and/or comfort purposes, the air is exhausted in larger volumes within the air channels.

The volume of air required for an active thermal insulation is modest, between 35 and 65 cfm per 1,000 sq. ft. of treatment. By selecting the airflow and temperature for winter or summer, one can choose the amount of energy conservation desired for a particular climate. During winter conditions the apparent R-value is larger if air is drawn from room temperature exhaust. During the summer season, the apparent R-value is larger if the air is drawn from beneath the frost line. The efficiency of the active thermal insulation increases as the ambient temperature cools during the winter season as shown by an increase of apparent R-value.

Math Model Trial Results

Tabulated results from using the math model solution for an arrangement of 2" thickness of air channel containing a 1" air space and 2" thickness of conductive ply channel over a standard 2"×4" Stud wall 16" on center with $3^{1/2}$" of fiberglass insulation are listed in Table 1.

Trial numbers 1 and 2 listed in Table 1 used ambient air through a heat exchanger in winter conditions. Trial number 1 used 5 cfm of air through a 20'×4" diameter plastic pipe heat exchanger which has a surface area of 21 sq. ft. for heat transfer. Trial number 2 used 10 cfm through a 42 sq. ft. of heat exchanger surface. The apparent R-value was 30.62 for trial number 1 and 32.21 for trial number 2. It should be noted that conventional $3^{1/2}$" of fiberglass insulation yields an R-value of 13. The installation of an energy conserving active thermal insulation would normally increase the R-value by the addition of passive insulation, however it is the use of airflow and conductive ply that are responsible for the improved apparent R-values. Exhaust ventilation air was selected in two trials, numbers 3 and 6. The apparent R-value is in the 66 plus range of resistance for both winter and summer ambient conditions.

Trial number 4 and 5 used the same volumes of air through the same heat exchanger surfaces as trials 1 and 2 simulating summer conditions of 90° F. ambient air with a 15° F. sinusoidal variation. The apparent R-value was 99.58 for trial number 4 and infinity for trial number 5. Trial number 4 required cooling for 22 hours, the last two hours did not require cooling. The apparent R-value was selected at the midpoint of 12 hour at −241 Btu/12 hrs., which is 99.58. Trial number 5 did not require cooling over the 24-hour period and thus the apparent R-value is infinity for this example. The generated hourly results from trials 1 through 6 are listed as Trial 1 through 6.

TABLE 1

Apparent R-Value Determined by Mathematical Model Solution
2" Air Channel with 1" Air Space and 2" Conductive Ply Channel
Over Conventional 2" × 4" Structure with 3½" Fiberglass Insulation

| Trial | Heat Exchanger (sq. ft) | Earth Temp. (° F.) | Exhaust Air Temp. (° F.) | Air Volume (cfm) | Energy Flow (Btu/day) | Conductance (Btu/hr · ft$^2$ · ° F.) | Apparent R-Value 1/U |
|---|---|---|---|---|---|---|---|
| Winter Season Arrangement Ambient Air is 30° F. with 15° F. Variation; Room Temperature controlled at 70° F. ||||||||
| 1 | 21 | 50 | — | 5 | 3,135 | 0.0327 | 30.62 |
| 2 | 42 | 50 | — | 10 | 2,980 | 0.0304 | 32.21 |
| 3 | 0 | — | 70 | 5 | 725 | 0.0151 | 66.23 |
| Summer Season Arrangement Ambient Air is 90° F. with 15° F. Variation; Room Temperature controlled at 70° F. ||||||||
| 4 | 21 | 50 | — | 5 | 0.565 | 0.0100 | 99.58* |
| 5 | 42 | 50 | — | 10 | +700 | 0.0000 | Infinity** |
| 6 | 0 | — | 70 | 5 | −362 | 0.0151 | 66.23 |

The over-all heat transfer coefficients were constant for the both summer and winter arrangements.
Variables
1) Ply thickness for all Trials used 0.003 inches
2) Ply length for all Trials used 12.5 inches
3) Surface area for both Air and Ply channels for Trial 1, 2, 4 and 5 used 100 sq. ft.
4) Surface area for both Air and Ply channels for Trial 3 and 6 used 50 sq. ft.
*Cooling was necessary for 22 hours, but not for the last 2 hours. The apparent R value was calculated at the midpoint of 12 hours.
**No cooling was required to maintain 70° F. room temperature across the 2" × 4" conventional construction.

---

Trial No. 1
Hourly Results are for 2" Air Channel Containing
1" Air Space and 2" Conductive Ply Channel
over a 2" × 4" stud wall with 3½" fiberglass insulation The following conditions were selected to simulate a New England summer or winter season.

Ambient Temperature 30.0° F. with 15.0° F. sinusoidal variation
Heat Exchanger surface area 21.0 sq. ft.
Over-all Heat-Transfer coef betwn ambient and airflow is
U = 0.134 Btu/hr · ft$^2$ · ° F.
Earth Temperature is 50.0° F., and Fan volume is 5 cfm
Room Temperature is 70.0° F.
Over-all Heat Transfer coef. between airflow and room temp. is
U = 0.059 Btu/hr · ft$^2$ · ° F.
Conductive ply thickness is 0.003 inches, and length is = 12.50 inches
Over-all Heat-Transfer coef. between conductive ply and room temp is
U = 0.0457 Btu/hr · ft$^2$ · ° F.
The surface area of the air channel is 50.0 sq. ft.
The surface area of the ply channel is 50.0 sq. ft.
The number of iterations is 8 times The hourly tabulated results for computer trial are listed below:

| Ambient Temp. (F.) | Airflow Temp. (F.) | Accumulative Ply and Air Channel (Btu) | Ply Channel Surface (Btu) | Air Channel Surface (Btu) | Time (hr) |
|---|---|---|---|---|---|
| 33.9 | 45.6 | 122.4 | 55.2 | 67.2 | 1 |
| 37.5 | 47.7 | 237.1 | 106.4 | 130.7 | 2 |
| 40.6 | 49.6 | 345.2 | 154.2 | 191.0 | 3 |
| 43.0 | 51.0 | 448.2 | 199.4 | 248.9 | 4 |
| 44.5 | 51.9 | 548.1 | 242.9 | 305.2 | 5 |
| 45.0 | 52.2 | 646.9 | 285.9 | 360.9 | 6 |
| 44.5 | 51.9 | 746.7 | 329.5 | 417.2 | 7 |
| 43.0 | 51.0 | 849.8 | 374.7 | 475.1 | 8 |
| 40.6 | 49.6 | 957.9 | 422.5 | 535.3 | 9 |
| 37.5 | 47.7 | 1072.6 | 473.7 | 598.8 | 10 |
| 33.9 | 45.6 | 1194.9 | 528.9 | 666.1 | 11 |
| 30.0 | 43.3 | 1325.6 | 588.3 | 737.3 | 12 |
| 26.1 | 41.0 | 1464.5 | 652.0 | 812.5 | 13 |
| 22.5 | 38.8 | 1611.0 | 719.6 | 891.5 | 14 |
| 19.4 | 37.0 | 1764.2 | 790.6 | 973.6 | 15 |
| 17.0 | 35.6 | 1922.4 | 864.2 | 1058.2 | 16 |
| 15.5 | 34.7 | 2083.8 | 939.5 | 1144.4 | 17 |
| 15.0 | 34.4 | 2246.3 | 1015.3 | 1231.0 | 18 |
| 15.5 | 34.7 | 2407.8 | 1090.6 | 1317.2 | 19 |
| 17.0 | 35.6 | 2566.0 | 1164.2 | 1401.8 | 20 |
| 19.4 | 37.0 | 2719.2 | 1235.2 | 1483.9 | 21 |
| 22.5 | 38.8 | 2865.7 | 1302.8 | 1562.9 | 22 |
| 26.1 | 41.0 | 3004.6 | 1366.5 | 1638.1 | 23 |
| 30.0 | 43.3 | 3135.2 | 1425.9 | 1709.3 | 24 |

Trial No. 2
Hourly Results are for 2" Air Channel Containing
1" Air Space and 2" Conductive Ply Channel
over a 2" × 4" stud wall with 3½" fiberglass insulation The following conditions were selected to simulate a New England summer or winter season.

Ambient Temperature 30.0° F. with 15.0° F. sinusoidal variation
Heat Exchanger surface area 42.0 sq. ft.
Over-all Heat-Transfer coef betwn ambient and airflow is
U = 0.134 Btu/hr · ft$^2$ · ° F.
Earth Temperature is 50.0° F., and Fan volume is 10 cfm
Room Temperature is 70.0° F.
Over-all Heat Transfer coef. between airflow and room temp. is
U = 0.059 Btu/hr · ft$^2$ · ° F.
Conductive ply thickness is 0.003 inches, and length is 12.50 inches
Over-all Heat-Transfer coef. between conductive ply and room temp is
U = 0.0457 Btu/hr · ft$^2$ · ° F.
The surface area of the air channel is 50.0 sq. ft.

-continued

Trial No. 2
Hourly Results are for 2" Air Channel Containing
1" Air Space and 2" Conductive Ply Channel
over a 2" × 4" stud wall with 3½" fiberglass insulation The surface area of the ply channel is 50.0 sq. ft.
The number of iterations is 8 times The hourly tabulated results for computer trial are listed below:

| Ambient Temp. (F.) | Airflow Temp. (F.) | Accumulative Ply and Air Channel (Btu) | Ply Channel Surface (Btu) | Air Channel Surface (Btu) | Time (hr) |
|---|---|---|---|---|---|
| 33.9 | 46.8 | 118.3 | 53.8 | 64.5 | 1 |
| 37.5 | 48.3 | 231.2 | 104.3 | 126.8 | 2 |
| 40.6 | 49.6 | 339.3 | 152.2 | 187.2 | 3 |
| 43.0 | 50.6 | 443.9 | 197.9 | 246.0 | 4 |
| 44.5 | 51.2 | 546.2 | 242.3 | 303.9 | 5 |
| 45.0 | 51.4 | 647.7 | 286.2 | 361.5 | 6 |
| 44.5 | 51.2 | 750.0 | 330.6 | 419.4 | 7 |
| 43.0 | 50.6 | 854.6 | 376.4 | 478.2 | 8 |
| 40.6 | 49.6 | 962.7 | 424.2 | 538.5 | 9 |
| 37.5 | 48.3 | 1075.6 | 474.7 | 600.8 | 10 |
| 33.9 | 46.8 | 1193.9 | 528.5 | 665.4 | 11 |
| 30.0 | 45.2 | 1318.0 | 585.7 | 732.3 | 12 |
| 26.1 | 43.6 | 1448.1 | 646.3 | 801.7 | 13 |
| 22.5 | 42.0 | 1583.6 | 710.2 | 873.4 | 14 |
| 19.4 | 40.8 | 1723.8 | 776.7 | 947.0 | 15 |
| 17.0 | 39.8 | 1867.5 | 845.4 | 1022.1 | 16 |
| 15.5 | 39.1 | 2013.6 | 915.4 | 1098.2 | 17 |
| 15.0 | 38.9 | 2160.4 | 985.9 | 1174.6 | 18 |
| 15.5 | 39.1 | 2306.5 | 1055.8 | 1250.6 | 19 |
| 17.0 | 39.8 | 2450.2 | 1124.5 | 1325.7 | 20 |
| 19.4 | 40.8 | 2590.4 | 1191.1 | 1399.3 | 21 |
| 22.5 | 42.0 | 2725.9 | 1254.9 | 1471.0 | 22 |
| 26.1 | 43.6 | 2856.0 | 1315.5 | 1540.4 | 23 |
| 30.0 | 45.2 | 2980.1 | 1372.7 | 1607.4 | 24 |

Trial No. 3
Hourly Results are for 2" Air Channel Containing
1" Air Space and 2" Conductive Ply Channel
over a 2" × 4" stud wall with 3½" fiberglass insulation The following conditions were selected to simulate a New England summer or winter season.

Ambient Temperature 30.0° F. with 15.0° F. sinusoidal variation
Heat Exchanger surface area 0.0 sq. ft.
Over-all Heat-Transfer coef betwn ambient and airflow is
U = 0.134 Btu/hr · ft^2 · ° F.
Inlet Temperature is 70.0° F., and Fan volume is 5 cfm
Room Temperature is 70.0° F.
Over-all Heat Transfer coef. between airflow and room temp. is
U = 0.059 Btu/hr · ft^2 · ° F.
Conductive ply thickness is 0.003 inches, and length is 12.50 inches
Over-all Heat-Transfer coef. between conductive ply and room temp is
U = 0.0457 Btu/hr · ft^2 · ° F.
The surface area of the air channel is 25.0 sq. ft.
The surface area of the ply channel is 25.0 sq. ft.
The number of iterations is 8 times The hourly tabulated results for computer trial are listed below:

| Ambient Temp. (F.) | Airflow Temp. (F.) | Accumulative Ply and Air Channel (Btu) | Ply Channel Surface (Btu) | Air Channel Surface (Btu) | Time (hr) |
|---|---|---|---|---|---|
| 33.9 | 55.0 | 27.3 | 16.0 | 11.3 | 1 |
| 37.5 | 56.5 | 51.8 | 30.3 | 21.5 | 2 |
| 40.6 | 57.8 | 74.0 | 43.3 | 30.7 | 3 |
| 43.0 | 58.8 | 94.4 | 55.2 | 39.2 | 4 |
| 44.5 | 59.4 | 113.6 | 66.5 | 47.1 | 5 |
| 45.0 | 59.6 | 132.5 | 77.5 | 55.0 | 6 |
| 44.5 | 59.4 | 151.8 | 88.8 | 63.0 | 7 |
| 43.0 | 58.8 | 172.2 | 100.7 | 71.4 | 8 |
| 40.6 | 57.8 | 194.4 | 113.7 | 80.6 | 9 |
| 37.5 | 56.5 | 218.9 | 128.1 | 90.8 | 10 |
| 33.9 | 55.0 | 246.2 | 144.0 | 102.1 | 11 |
| 30.0 | 53.4 | 276.3 | 161.7 | 114.6 | 12 |
| 26.1 | 51.8 | 309.5 | 181.1 | 128.4 | 13 |
| 22.5 | 50.3 | 345.3 | 202.1 | 143.3 | 14 |
| 19.4 | 49.0 | 383.5 | 224.4 | 159.1 | 15 |
| 17.0 | 48.0 | 423.5 | 247.8 | 175.7 | 16 |
| 15.5 | 47.4 | 464.7 | 271.9 | 192.8 | 17 |
| 15.0 | 47.2 | 506.2 | 296.2 | 210.0 | 18 |
| 15.5 | 47.4 | 547.3 | 320.3 | 227.1 | 19 |
| 17.0 | 48.0 | 587.3 | 343.7 | 243.6 | 20 |
| 19.4 | 49.0 | 625.5 | 366.0 | 259.5 | 21 |
| 22.5 | 50.3 | 661.4 | 387.0 | 274.4 | 22 |
| 26.1 | 51.8 | 694.5 | 406.4 | 288.1 | 23 |
| 30.0 | 53.4 | 724.7 | 424.1 | 300.6 | 24 |

Trial No. 4
Hourly Results are for 2" Air Channel Containing
1" Air Space and 2" Conductive Ply Channel
over a 2" × 4" stud wall with 3½" fiberglass insulation The following conditions were selected to simulate a New England summer or winter season.

Ambient Temperature 90.0° F. with 15.0° F. sinusoidal variation
Heat Exchanger surface area 21.0 sq. ft.
Over-all Heat-Transfer coef betwn ambient and airflow is
U = 0.134 Btu/hr · ft^2 · ° F.
Earth Temperature is 50.0° F., and Fan volume is 5 cfm
Room Temperature is 70.0° F.
Over-all Heat Transfer coef. between airflow and room temp. is
U = 0.059 Btu/hr · ft^2 · ° F.
Conductive ply thickness is 0.003 inches, and length is 12.50 inches
Over-all Heat-Transfer coef. between conductive ply and room temp. is
U = 0.0457 Btu/hr · ft^2 · ° F.
The surface area of the air channel is 50.0 sq. ft.
The surface area of the ply channel is 50.0 sq. ft.
The number of iterations is 8 times The hourly tabulated results for computer trial are listed below:

| Ambient Temp. (F.) | Airflow Temp. (F.) | Accumulative Ply and Air Channel (Btu) | Ply Channel Surface (Btu) | Air Channel Surface (Btu) | Time (hr) |
|---|---|---|---|---|---|
| 93.9 | 81.5 | −8.2 | −11.6 | 3.3 | 1 |
| 97.5 | 83.6 | −24.1 | −27.1 | 2.9 | 2 |
| 100.6 | 85.5 | −46.6 | −46.0 | −0.6 | 3 |
| 103.0 | 86.9 | −74.2 | −67.5 | −6.7 | 4 |
| 104.5 | 87.8 | −105.0 | −90.7 | −14.3 | 5 |
| 105.0 | 88.1 | −136.8 | −114.4 | −22.4 | 6 |
| 104.5 | 87.8 | −167.6 | −137.6 | −30.0 | 7 |
| 103.0 | 86.9 | −195.2 | −159.1 | −36.0 | 8 |
| 100.6 | 85.5 | −217.7 | −178.0 | −39.6 | 9 |
| 97.5 | 83.6 | −233.6 | −193.5 | −40.0 | 10 |
| 93.9 | 81.5 | −241.8 | −205.1 | −36.7 | 11 |
| 90.0 | 79.2 | −241.8 | −212.4 | −29.4 | 12 |
| 86.1 | 76.8 | −233.5 | −215.5 | −18.0 | 13 |
| 82.5 | 74.7 | −217.5 | −214.6 | −3.0 | 14 |
| 79.4 | 72.8 | −195.0 | −210.3 | 15.3 | 15 |
| 77.0 | 71.4 | −167.4 | −203.4 | 36.0 | 16 |
| 75.5 | 70.5 | −136.6 | −194.9 | 58.3 | 17 |
| 75.0 | 70.2 | −104.7 | −185.8 | 81.1 | 18 |

-continued

Trial No. 4
Hourly Results are for 2" Air Channel Containing
1" Air Space and 2" Conductive Ply Channel
over a 2" × 4" stud wall with 3½" fiberglass insulation

| | | | | | |
|---|---|---|---|---|---|
| 75.5 | 70.5 | −73.9 | −177.2 | 103.4 | 19 |
| 77.0 | 71.4 | −46.2 | −170.3 | 124.1 | 20 |
| 79.4 | 72.8 | −23.7 | −166.0 | 142.3 | 21 |
| 82.5 | 74.7 | −7.7 | −165.1 | 157.4 | 22 |
| 86.1 | 76.8 | 0.5 | −168.2 | 168.7 | 23 |
| 90.0 | 79.2 | 0.6 | −175.5 | 176.1 | 24 |

Trial No. 5
Hourly Results are for 2" Air Channel Containing
1" Air Space and 2" Conductive Ply Channel
over a 2" × 4" stud wall with 3½" fiberglass insulation The following conditions were selected to simulate a New England summer or winter season.

Ambient Temperature 90.0° F. with 15.0° F. sinusoidal variation
Heat Exchanger surface area 42.0 sq. ft.
Over-all Heat-Transfer coef betwn ambient and airflow is
U = 0.134 Btu/hr · ft^2 · ° F.
Earth Temperature is 50.0° F., and Fan volume is 10 cfm
Room Temperature is 70.0° F.
Over-all Heat Transfer coef. between airflow and room temp. is
U = 0.059 Btu/hr · ft^2 · ° F.
Conductive ply thickness is 0.003 inches, and length is 12.50 inches
Over-all Heat-Transfer coef. between conductive ply and room temp. is
U = 0.0457 Btu/hr · ft^2 · ° F.
The surface area of the air channel is 50.0 sq. ft.
The surface area of the ply channel is 50.0 sq. ft.
The number of iterations is 8 times The hourly tabulated results for computer trial are listed below:

| Ambient Temp. (F.) | Airflow Temp. (F.) | Accumulative Ply and Air Channel (Btu) | Ply Channel Surface (Btu) | Air Channel Surface (Btu) | Time (hr) |
|---|---|---|---|---|---|
| 93.9 | 72.3 | 23.3 | −0.7 | 24.1 | 1 |
| 97.5 | 73.8 | 41.2 | −4.7 | 45.9 | 2 |
| 100.6 | 75.1 | 54.4 | −11.4 | 65.7 | 3 |
| 103.0 | 76.0 | 63.9 | −20.2 | 84.1 | 4 |
| 104.5 | 76.7 | 71.2 | −30.3 | 101.5 | 5 |
| 105.0 | 76.9 | 77.8 | −40.9 | 118.7 | 6 |
| 104.5 | 76.7 | 85.1 | −51.0 | 136.1 | 7 |
| 103.0 | 76.0 | 94.7 | −59.8 | 154.5 | 8 |
| 100.6 | 75.1 | 107.9 | −66.5 | 174.3 | 9 |
| 97.5 | 73.8 | 125.7 | −70.4 | 196.1 | 10 |
| 93.9 | 72.3 | 149.0 | −71.2 | 220.2 | 11 |
| 90.0 | 70.6 | 178.2 | −68.5 | 246.7 | 12 |
| 86.1 | 69.0 | 213.3 | −62.4 | 275.6 | 13 |
| 82.5 | 67.5 | 253.8 | −53.1 | 306.8 | 14 |
| 79.4 | 66.2 | 299.0 | −41.0 | 340.0 | 15 |
| 77.0 | 65.3 | 347.8 | −26.8 | 374.6 | 16 |
| 75.5 | 64.6 | 398.8 | −11.4 | 410.2 | 17 |
| 75.0 | 64.4 | 450.7 | 4.6 | 446.1 | 18 |
| 75.5 | 64.6 | 501.7 | 20.1 | 481.7 | 19 |
| 77.0 | 65.3 | 550.5 | 34.2 | 516.3 | 20 |
| 79.4 | 66.2 | 595.7 | 46.3 | 549.5 | 21 |
| 82.5 | 67.5 | 636.3 | 55.6 | 580.7 | 22 |
| 86.1 | 69.0 | 671.3 | 61.7 | 609.6 | 23 |
| 90.0 | 70.6 | 700.5 | 64.4 | 636.1 | 24 |

Trial No. 6
Hourly Results are for 2" Air Channel Containing
1" Air Space and 2" Conductive Ply Channel
over a 2" × 4" stud wall with 3½" fiberglass insulation The following conditions were selected to simulate a New England summer or winter season.

Ambient Temperature 90.0° F. with 15.0° F. sinusoidal variation
Heat Exchanger surface area 0.0 sq. ft.
Over-all Heat-Transfer coef. betwn ambient and airflow is
U = 0.134 Btu/hr · ft^2 · ° F.
Inlet Temperature is 70.0° F., and Fan volume is 5 cfm
Room Temperature is 70.0° F.
Over-all Heat Transfer coef. between airflow and room temp. is
U = 0.059 Btu/hr · ft^2 · ° F.
Conductive ply thickness is 0.003 inches, and length is 12.50 inches
Over-all Heat-Transfer coef. between conductive ply and room temp. is
U = 0.0457 Btu/hr · ft^2 · ° F.
The surface area of the air channel is 25.0 sq. ft.
The surface area of the ply channel is 25.0 sq. ft.
The number of iterations is 8 times The hourly tabulated results for computer trial are listed below:

| Ambient Temp. (F.) | Airflow Temp. (F.) | Accumulative Ply and Air Channel (Btu) | Ply Channel Surface (Btu) | Air Channel Surface (Btu) | Time (hr) |
|---|---|---|---|---|---|
| 93.9 | 79.9 | −18.0 | −10.6 | −7.5 | 1 |
| 97.5 | 81.4 | −38.8 | −22.7 | −16.1 | 2 |
| 100.6 | 82.7 | −61.9 | −36.2 | −25.7 | 3 |
| 103.0 | 83.7 | −86.8 | −50.8 | −36.0 | 4 |
| 104.5 | 84.3 | −112.8 | −66.0 | −46.8 | 5 |
| 105.0 | 84.5 | −139.3 | −81.5 | −57.8 | 6 |
| 104.5 | 84.3 | −165.3 | −96.7 | −68.6 | 7 |
| 103.0 | 83.7 | −190.2 | −111.3 | −78.9 | 8 |
| 100.6 | 82.7 | −213.3 | −124.8 | −88.5 | 9 |
| 97.5 | 81.4 | −234.1 | −137.0 | −97.1 | 10 |
| 93.9 | 79.9 | −252.1 | −147.5 | −104.6 | 11 |
| 90.0 | 78.3 | −267.2 | −156.4 | −110.8 | 12 |
| 86.1 | 76.7 | −279.4 | −163.5 | −115.9 | 13 |
| 82.5 | 75.2 | −288.8 | −169.0 | −119.8 | 14 |
| 79.4 | 73.9 | −295.9 | −173.1 | −122.7 | 15 |
| 77.0 | 72.9 | −301.2 | −176.2 | −124.9 | 16 |
| 75.5 | 72.3 | −305.3 | −178.7 | −126.7 | 17 |
| 75.0 | 72.1 | −309.1 | −180.9 | −128.2 | 18 |
| 75.5 | 72.3 | −313.3 | −183.3 | −130.0 | 19 |
| 77.0 | 72.9 | −318.6 | −186.4 | −132.2 | 20 |
| 79.4 | 73.9 | −325.7 | −190.6 | −135.1 | 21 |
| 82.5 | 75.2 | −335.1 | −196.1 | −139.0 | 22 |
| 86.1 | 76.7 | −347.3 | −203.2 | −144.1 | 23 |
| 90.0 | 78.3 | −362.4 | −212.0 | −150.3 | 24 |

Although the illustrated examples have shown specific sizes and overall heat transfer coefficient values for the determination of energy that is required to maintain a desired room temperature when applied to an exterior framed wall of an insulated building structure, it is apparent that a number of changes, modifications, or slight alterations may be made, without departing from the theme of the invention. For example, the width of the air channel and conductive ply channel may be modified to fit upon the structure between the structural openings of windows, doors, fireplace, etc. The range of material sizes available for low density plastic foam may modify the thickness of the air channel and conductive ply channel. The thickness of the conductive ply may be modified to increase the conduction of energy into the adjacent conductive ply channel for the purpose of retarding the energy flow necessary to maintain a desired room temperature.

The volume of airflow, cubic feet per minute, heat exchanger surface if used, and earth temperature may be modified because of the location of the total structure and/or the desired R-value for a particular project. The apparent R-value is paramount to determine the building skin coefficient of conductance, Btu/hr per degree Fahrenheit (Btu/hr °F.). Additionally, the amount of energy required to heat or cool the exhaust ventilation and projected infiltration air when added to the building skin coefficient of conductance, results in a measure of total hourly energy requirements of the building structure. The annual thermal energy required of a building structure is then determined by the degree-days of the climate in question. It is significant to state that the math model solution in the presence of a competent designer affords him or her a solution of maximum energy saving at a minimum material cost.

Advanced Design Arrangements

Figure 4:
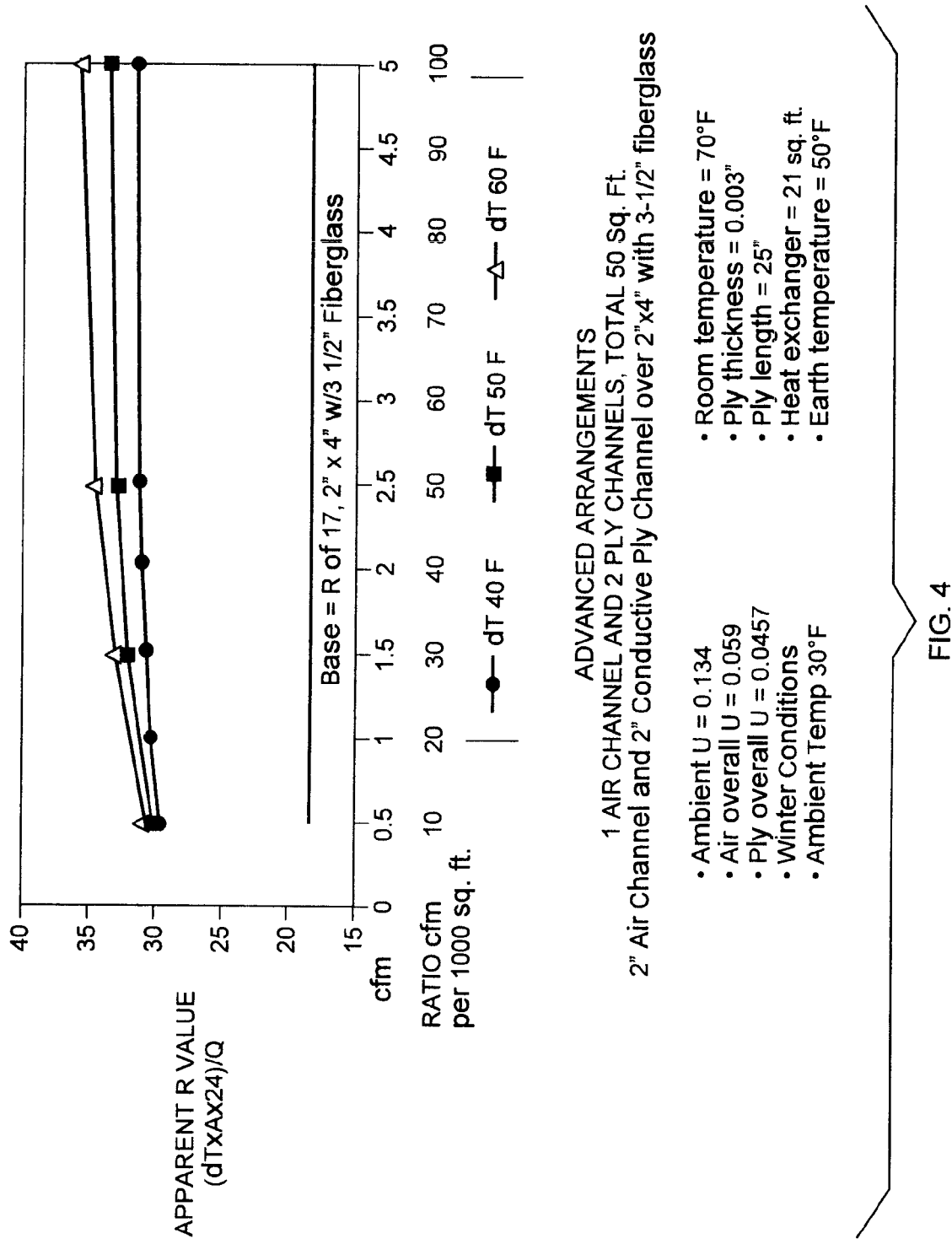
FIG. 4 is a graph showing the slope of R-value versus ratio of cfm (cubic feet per minute)/1000 sq. ft. of surface for different temperature differentials during winter conditions for a 50 sq. ft. arrangement of the present invention.

Graphs have been constructed to aid in the design and engineering for advance compilation of arrangements of the active thermal insulation. Graph 1 of FIG. 4 was created to show the slope of apparent R-value vs. ratio of cfm air/1000 sq. ft. of surface for ΔT of 40°, 50°, and 60° F. during winter conditions for a 50 sq. ft. arrangement. The 50 sq. ft. arrangement consisted of 1 air channel of 10 sq. ft. and 2 ply channels of 20 sq. ft. each, a 1:4 ratio of air channel surface to ply channels surface. The air was admitted from below the frost line through a heat exchanger.

Figure 5:
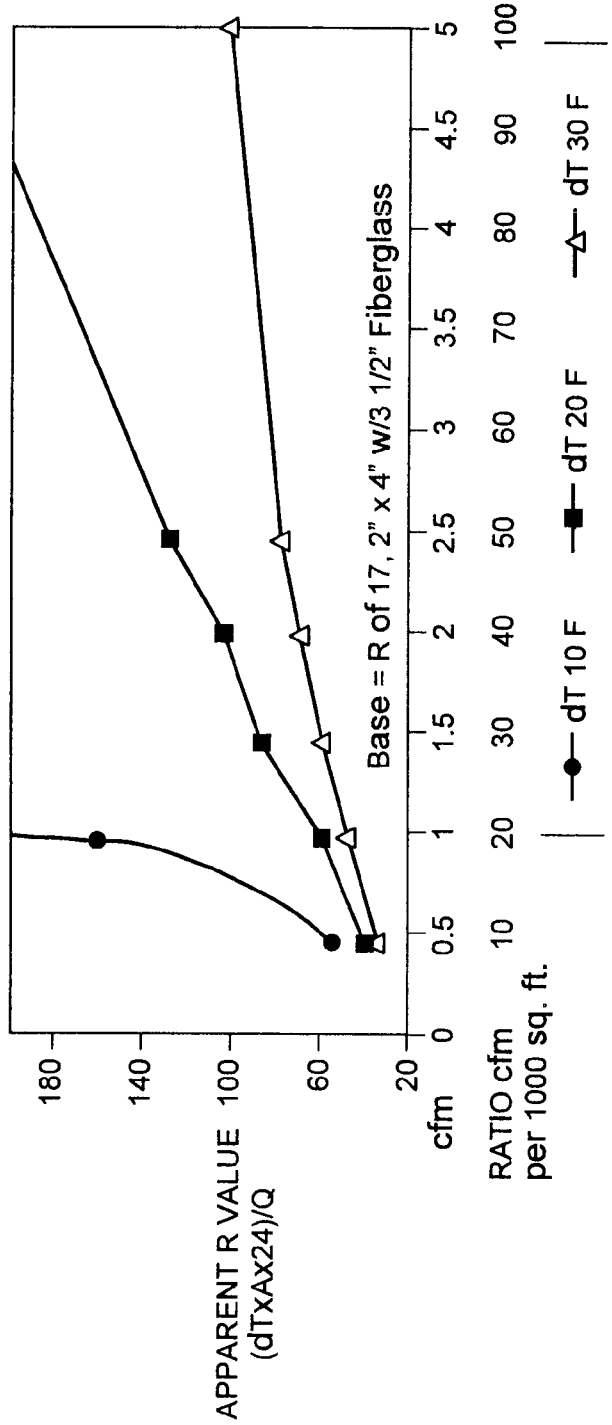
FIG. 5 is a graph showing the slope of R-value versus ratio of cfm/1000 sq. ft. of surface for different temperature differentials during summer conditions for a 50 sq. ft. arrangement of the present invention.

Graph 2 of FIG. 5 was created to show the slope of apparent R-value vs. ratio of cfm air/1000 sq. ft. of surface for ΔT of 10°, 20°, and 30° F. during summer condition for a 50 sq. ft. arrangement. The 50 sq. ft. arrangement consisted of 1 air channel of 10 sq. ft. and 2 ply channels of 20 sq. ft. each, a 1:4 ratio of air surface to ply channels surface. The air was admitted from below the frost line through a heat exchanger.

Figure 6:
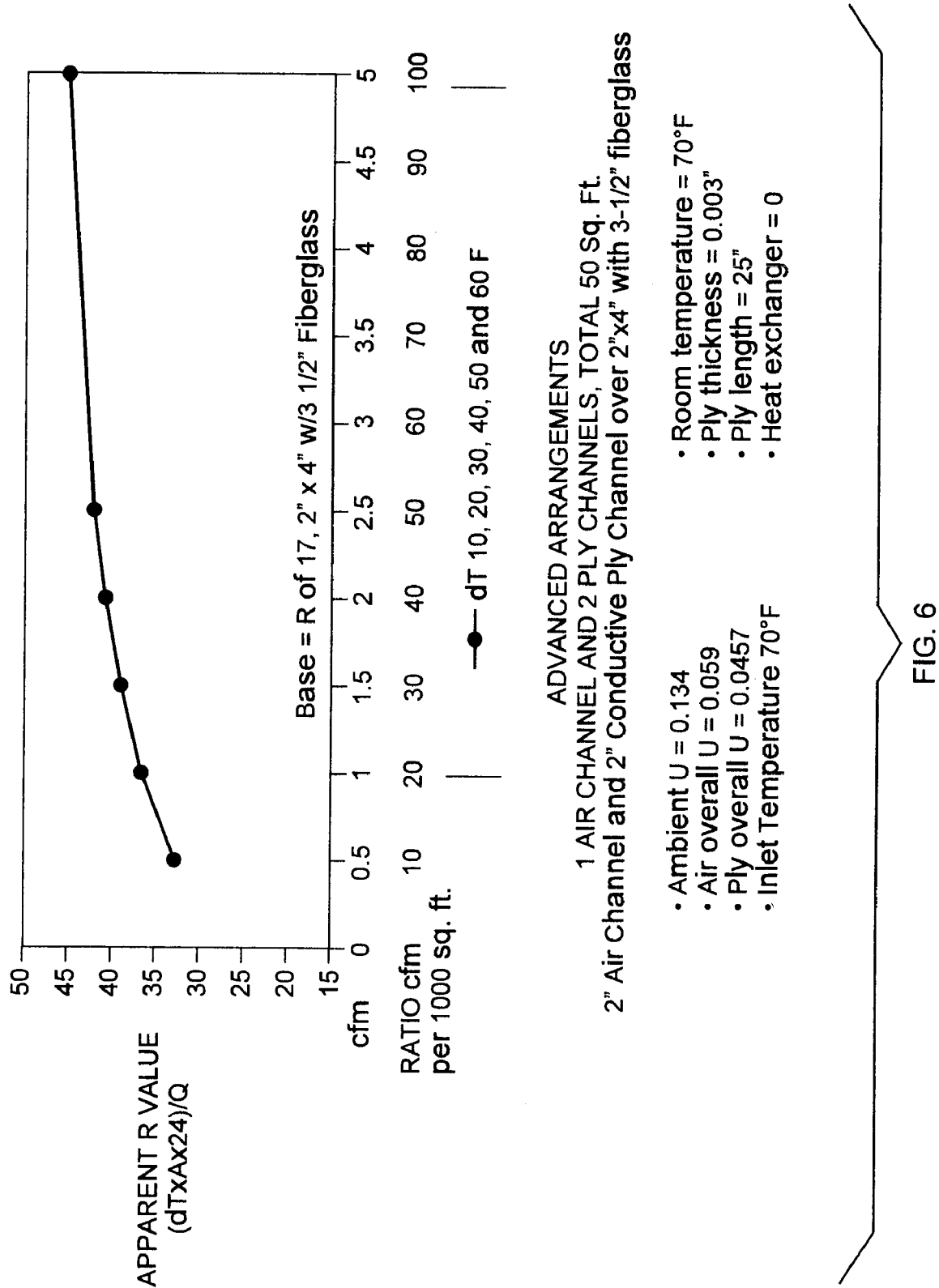
FIG. 6 is a graph showing the slope of R-value versus ratio of cfm/1000 sq. ft. of surface of a 50 sq. ft. surface arrangement of the present invention using exhaust ventilation.

Graph 3 of FIG. 6 was created to show the slope of apparent R-value vs. ratio of cfm air/1000 sq. ft. of a 50 sq. ft. of surface arrangement using exhaust ventilation. The apparent R-values are the same for both winter and summer conditions when exhaust ventilation of 70° F. room temperature air was used. The 50 sq. ft. arrangements consisted of 1 air channel of 10 sq. ft. and 2 ply channels of 20 sq. ft. each, a 1:4 ratio of air channel surface to ply channel surface.

Figure 7:
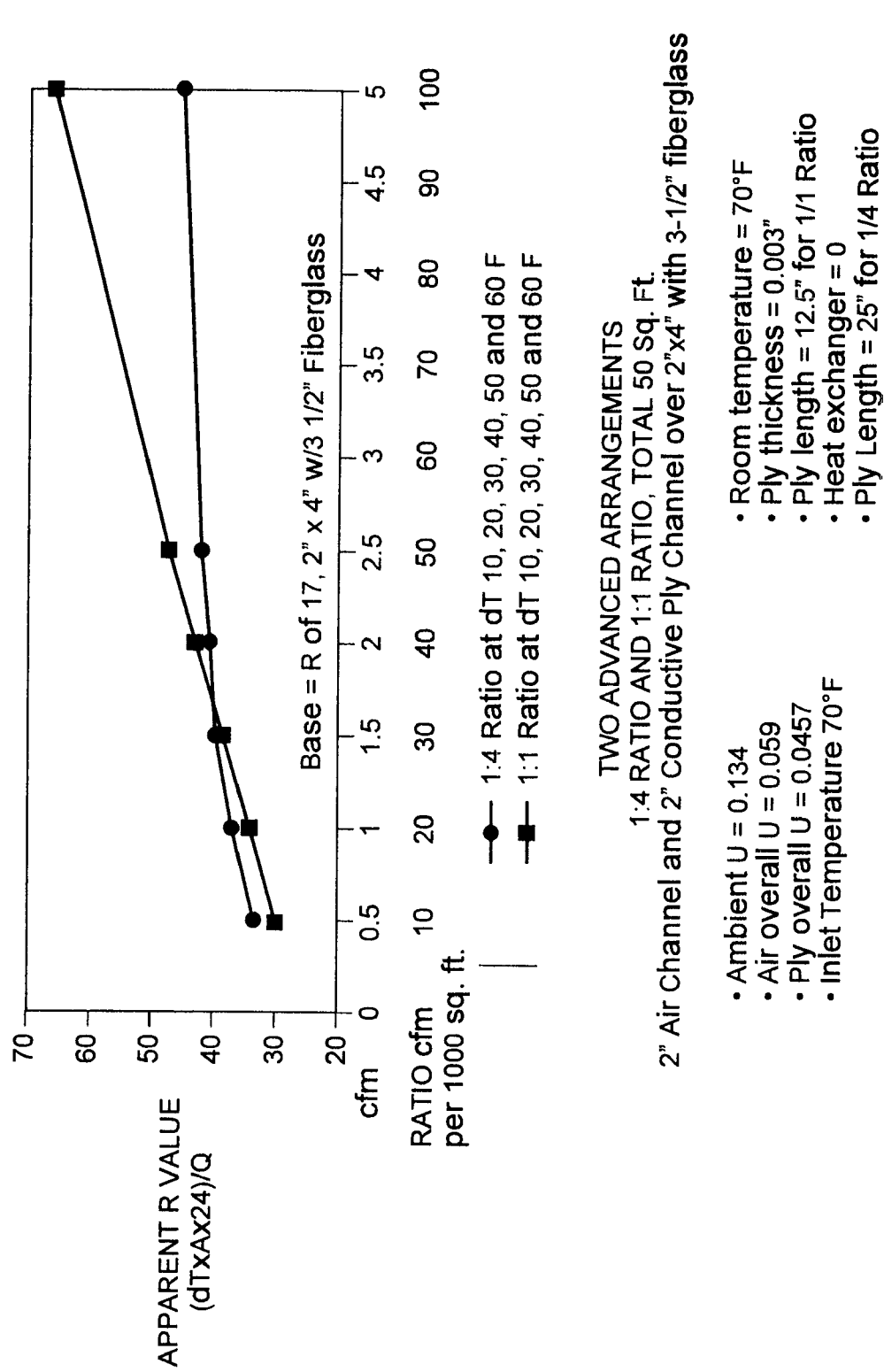
FIG. 7 is a graph showing the slope of R-value versus ratio of cfm for two different arrangements of the present invention using exhaust ventilation of room temperature air.

Graph 4 of FIG. 7, of two advanced arrangements, was created to show the difference in slopes of apparent R-values of each arrangements using exhaust ventilation of 70° F. room temperature air. The arrangements were 50 sq. ft. each as follows:

a) 1 air channel of 10 sq. ft. and 2 ply channels of 20 sq. ft. each. A 1:4 ratio of air channel surface to conductive ply channels surface.

b) 1 air channel of 25 sq. ft. and 1 ply channel of 25 sq. ft. each. A 1:1 ratio of air channel surface to conductive ply channel surface.

The slope of apparent R-value vs. the ratio of cfm air/1000 sq. ft. of surface was the same for summer and winter conditions for each arrangement. The slopes of apparent R-value crossed each other at a ratio of 34 cfm air/1000 sq. ft. of surface.

It is noteworthy that the 1:4 ratio arrangements are preferred when the exhaust ventilation of room temperature air is at lesser cfm values. The 1:1 ratio arrangement would be selected if a sunspace was available, or that an abundance of room temperature exhaust ventilation is available.

The energy conservation was achieved within a 2" envelope of space using standard material sizes currently available. The 2" addition converts the overall thickness from a 2"×4" stud wall structure to conventional 2"×6" stud wall dimensions. This invention may negate the continued use of a 2"×6" framing in new construction, which was simply inaugurated to improve upon the building insulation by using R-19 fiberglass insulation. The 2"×4" framing is more material and labor efficient than to 2"×6" framing. The use of the active thermal insulation with the 2"×4" framing is more cost effective for both new construction and for retrofitting a building structure which may require new windows, doors and insulation.

It can be concluded that an energy conserving active insulation is new, novel and a more effective treatment for energy conservation than conventional passive and/or reflective insulation. The placement of the conductive ply between 2 layers of low density plastic foam which conducts the energy perpendicular to the air flow into the adjacent ply channel is the primary active component since it performs as an equivalent vertical air channel without additional space and use of airflow. The conductive ply allows the ply channel to be filled with an extra layer of low density plastic foam which further increases the resistance to the flow of energy. The math model solution generated illustrations used only 1" of low density plastic foam over 1" of air. The adjacent conductive ply channel used a thin conductive ply and two layers of 1" of low density plastic foam. The use of this technique shows that the ability of this invention is to increase the insulation resistance beyond any current resistance values published to date.

It is to be understood that the example active insulation structure arrangements described herein are but representations of options for the arrangement of the present invention. This description is not intended to limit the principle concept of the present invention. All equivalents are deemed to fall within the scope of this description of the invention as described by the following claims.

What is claimed is:

1. An energy-conserving active thermal insulation system to be applied to the ambient surface of a building structure to be insulated, the system comprising:

a) a first layer of insulation, b) a second layer of insulation formed of a plurality of pieces of insulation material spaced from one another by an air gap in the form of an elongated channel, the plurality of pieces of insulation material affixable to the ambient surface of the building structure and configured to separate the first layer of insulation from the ambient surface when affixed to the building structure, and c) a conductive ply extending completely across a surface of each of the plurality of pieces of the second layer of insulation, wherein the conductive ply joins the first layer of insulation to the second layer of insulation at the surfaces of the plurality of pieces of insulation material of the second layer and wherein the conductive ply is fabricated of a thermally conductive material, wherein a conductive channel is formed for each piece of the second layer of insulation where the conductive ply joins together the first layer of insulation and the second layer of insulation an active air channel is formed at each of the elongated channels between the first layer of insulation and the ambient surface when the system is applied to the building structure, wherein the active air channels are configured to enable the flow of air therethrough for the conduction of energy from that air flow to the conductive channels or from the conductive channels to the active air channels.

2. The system as claimed in claim 1 further comprising one or more spacers between each of said plurality of pieces of insulation material of said second layer of insulation and said one or more active air channels separating said pieces of insulation material of said second layer of insulation from one another.

3. The system as claimed in claim 2 further comprising a conductive ply segment extending into each active air channel between each of the spacers and the first layer of insulation and in physical contact with the conductive ply.

4. The system as claimed in claim 1 wherein the first layer of insulation and the plurality of pieces of insulation material are formed of plastic foam.

5. The system as claimed in claim 1 wherein the conductive ply is fabricated of a thin metallic foil.

6. The system as claimed in claim 5 wherein the thin metallic foil is selected from silver, gold and aluminum.

7. The system as claimed in claim 1 further comprising an air blower arranged to generate air flow through the one or more air gaps.

8. The system as claimed in claim 1 wherein the one or more air gaps are established directly adjacent to the ambient surface of the building structure.

9. The system as claimed in claim 1 wherein the conductive ply is positioned between the first layer of insulation and the pieces of insulation material of the second layer of insulation and extends completely across a surface of each of the plurality of pieces of the second layer of insulation opposite from a surface of the second layer of insulation that is affixable to the ambient surface of the building structure so that there is no direct contact of the first layer of insulation with the second layer of insulation.

* * * * *